Jan. 5, 1937.  A. C. ZACHLIN  2,066,663
STORAGE BATTERY GRID
Filed Aug. 10, 1933

INVENTOR:
ANTHONY C. ZACHLIN
Kwis Hudson & Kent
ATTORNEYS

Patented Jan. 5, 1937

2,066,663

UNITED STATES PATENT OFFICE 2,066,663

STORAGE BATTERY GRID

Anthony C. Zachlin, South Euclid, Ohio, assignor to Willard Storage Battery Company, Cleveland, Ohio, a corporation of West Virginia Application August 10, 1933, Serial No. 684,511

3 Claims. (Cl. 136—38)

This invention relates to improvements in storage battery grids.

It has been discovered that a storage battery can be produced having certain desirable characteristics quite different from those of storage batteries heretofore in use. Among these desirable characteristics are low self-discharge or long shelf life, long period of serviceability, ability to deliver continuously low rates for exceptionally long periods of time or relatively high rates for short periods, smooth ampere-hour voltage characteristics, high efficiency from the standpoint of weight and space or size of cell, and simplicity of construction.

These characteristics and other desirable ones are due in part to the grid and plate construction wherein the plate has a large amount of active material and wherein the ratio of weight of grid to the weight of the active material is low, that is, where the percentage of lead in the grid is lower and the percentage of lead or its compounds in the active material is higher than customary. It is in the construction of a suitable grid for this purpose that the present invention lies.

A plate constructed to answer the above requirements requires a grid especially constructed to accommodate and retain a large amount of active material, with the thickness of the grid large in comparison to the grids used heretofore with substantially the same surface area. This means that the grid must be large in depth and therefore have a large capacity for active material, with a construction and arrangement of parts for supporting the active material such that the grid will have the necessary strength while, at the same time, the weight of the grid will be small in comparison with the weight of the active material which it supports.

In a companion application Serial No. 684,510, filed of even date herewith, there is disclosed a grid construction which answers the requirements for a battery having a relatively large ampere-hour capacity. The grid of the present application is especially adapted for plates of the character stated above, but is designed particularly for a smaller battery and one having a lesser number of plates, preferably two, although not necessarily confined to a cell having only two plates.

The invention further aims to provide an improved grid structure wherein a terminal post is formed as an integral part of the grid.

The preferred construction of my invention is illustrated in the accompanying sheet of drawing, wherein.

Figure 5:
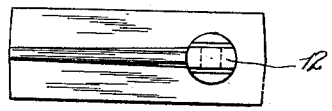
Fig. 5 is a top plan view.

Referring now to the drawing, it will be seen that this grid is composed of a rectangular frame of considerable depth, having upright parallel sides 10, 10 and top and bottom walls 11, 11, and a terminal post 12 projecting upwardly from the top wall. This grid is so constructed that the top, bottom and side walls form the outline of a deeply-chambered receptacle more open on one side than on the other.

Figure 2:
Fig. 2 is a similar view looking at the opposite side of the grid.

On one side, i. e., on the side which is away from the separator and from the adjacent face of the plate of opposite polarity where a similarly formed grid will be employed, are a series of vertical ribs 13 equally spaced from each other and from the side walls extending between the top and bottom walls, and, of course, integral therewith. Likewise, on the same side of the grid are a series of horizontal ribs 14 which extend between the upright side walls and are joined therewith and with the vertical ribs 13. All these ribs are flush with the outer surface of the grid on the side thereof mentioned above. The grid, when viewed from the side just stated, is shown in Fig. 2.

Figure 3:
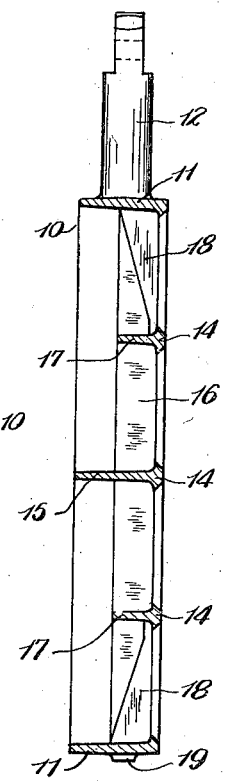
Fig. 3 is a vertical sectional view substantially along the line 3—3 of Fig. 1.
Figure 4:
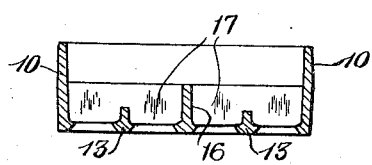
Fig. 4 is a transverse sectional view substantially along the line 4—4 of Fig. 1.

Viewing the grid from the opposite side, a much more open construction is found. Here will be seen a horizontal partition or web 15 midway between the top and bottom walls and extending between the side walls and constituting a continuation of the central horizontal rib 14. This partition 15 extends the full depth of the grid, as will best be seen by reference to Fig. 3. The partition 15 in effect divides the grid into upper and lower chambered halves. Additional partitions or ribs divide each half into quarters, these partitions including a central vertical web 16 extending between the top and bottom walls and intersecting the horizontal partition 15, this web 16 constituting a continuation of the central vertical rib 13 and extending forwardly therefrom for a distance equivalent to about one-half the depth of the grid. Additionally, there is a forwardly projecting horizontal web 17 in the upper half and there is a horizontally projecting web 17 in the lower half, these extending between the upright side walls intersecting the vertical web 16 and forming continuations of the upper and lower horizontal ribs 14, these horizontal webs projecting forwardly the same distance as the vertical web 16, i. e., a distance equal to about one-half the depth of the grid.

As will be seen from the sectional views of the drawing, the webs 15, 16 and 17 are all relatively thin, substantially flat webs each of which has side faces which are substantially parallel to each other. In referring to the faces of these webs I use the term "substantially parallel" to describe faces which have only enough taper to provide for satisfactory removal of the grid from the casting die.

Additionally, there are provided in the upper quarter and also in the lower quarter of the grid two triangularly shaped webs 18 which constitute continuations of the upper and lower portions of the two outer vertical ribs 13 and project forwardly from the latter. In the upper quarter they extend from the upper horizontal web 17 diagonally forwardly and upwardly, where they join with the top wall 11, and in the lower quarter of the grid they extend from the lower web 17 diagonally forwardly and downwardly where they are joined to the bottom wall 11. The depth of these upper and lower diagonal webs at their deepest portions is substantially one-half the depth of the grid. It will be noted that the ribs 13 and 14 as above described and as shown in the drawing are of substantially T cross sectional shape and have the stem portions thereof extending toward the relatively open outer face of the grid. The web or partition 15 which forms the stem portion of one of the horizontal ribs 14 extends to the relatively open outer face of the grid but the stem portions of the other ribs extend only part-way to the relatively open outer face.

On the bottom wall are preferably placed two lugs 19 which are adapted to engage the outer sides of a pair of bottom rests of the casing or jar of the cell so that, by the overlapping arrangement of these lugs and the bottom rests, movement of the grid in an edgewise direction in the cell will be prevented.

Figure 1:
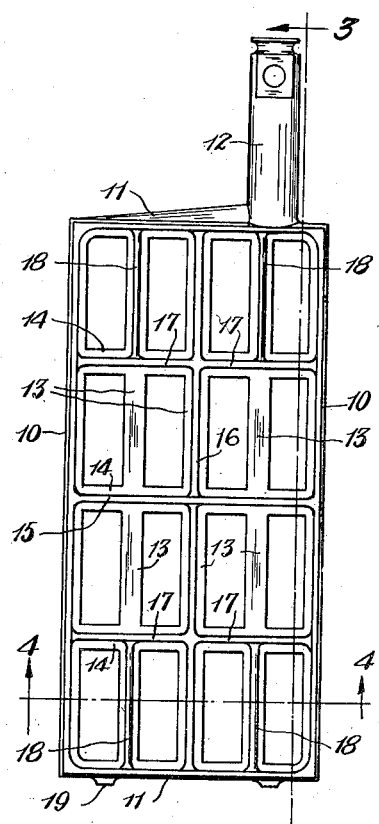
Fig. 1 is a face or side view looking toward the relatively open side of the grid, which is the side into which the active material is introduced and the side which faces the plate of opposite polarity.

As mentioned above, it is a further feature of my invention that a terminal post, in this instance the terminal post 12, be formed integral with the grid. In Fig. 1 the post 12 is shown as being formed or cast integral with the grid and as being of considerable length so that when the plates are in position in the battery cell this terminal post will project through and above the cell cover.

By the above construction the desired results are accomplished in a very effective manner. However, I do not desire to be confined to the exact details or arrangements shown, as changes may be made in the arrangement or number of ribs or other active-material-holding parts, and I therefore aim in my claims to cover all modifications which do not involve a departure from the spirit and scope of my invention.

Having thus described my invention, I claim:

1. A grid of the flat type having substantially parallel outer faces, comprising a deeply-dished marginal frame composed of side, top and bottom walls, said grid being open on one outer face thereof and on its other outer face having horizontal and vertical ribs extending between said walls, and relatively thin substantially flat webs of tapering depth within the grid at the upper and lower portions thereof and disposed in line with certain of said ribs.

2. A one-piece grid of the flat type having substantially parallel outer faces, consisting of a relatively deep marginal frame composed of side, top and bottom walls, intersecting vertical and horizontal ribs extending between the walls of the frame at one outer face of the grid, said grid being relatively open at its other outer face, a transverse relatively thin horizontal web extending from one of said ribs substantially to said other outer face and dividing the frame into upper and lower halves, and intersecting relatively thin horizontal and vertical webs extending from others of said ribs toward said other outer face and dividing each of said halves into sections, said last mentioned webs being of less depth than said transverse horizontal web, all of said webs having their side faces substantially parallel.

3. A storage battery grid of the flat type having substantially parallel outer faces, comprising a deeply-dished marginal frame relatively open on one face thereof and on the other face thereof having intersecting vertical and horizontal ribs of substantially T-cross section, said ribs being disposed with the stems of the T sections extending toward said relatively open outer face, at least one of said stems extending to said relatively open outer face and other stems extending only part-way toward said relatively open outer face.

ANTHONY C. ZACHLIN.